United States Patent
Bohlender et al.

(10) Patent No.: US 10,724,763 B2
(45) Date of Patent: Jul. 28, 2020

(54) ELECTRIC HEATING DEVICE AND PTC HEATING ELEMENT OF AN ELECTRIC HEATING DEVICE

(71) Applicant: Eberspacher catem GmbH & Co. KG, Herxheim (DE)

(72) Inventors: Franz Bohlender, Kandel (DE); Andreas Schwarzer, Frankfurt am Main (DE)

(73) Assignee: Eberspächer catem GmbH & Co. KG, Herxheim (DE)

( * ) Notice: Subject to any disclaimer, the term of this patent is extended or adjusted under 35 U.S.C. 154(b) by 274 days.

(21) Appl. No.: 15/832,956

(22) Filed: Dec. 6, 2017

(65) Prior Publication Data
US 2018/0156494 A1   Jun. 7, 2018

(30) Foreign Application Priority Data

Dec. 6, 2016   (DE) .................. 10 2016 224 296
Feb. 6, 2017   (EP) .................... 17154801

(51) Int. Cl.
*F24H 9/20*   (2006.01)
*F24H 1/00*   (2006.01)
(Continued)

(52) U.S. Cl.
CPC ......... *F24H 9/2028* (2013.01); *B60H 1/2215* (2013.01); *B60H 1/2225* (2013.01);
(Continued)

(58) Field of Classification Search
None
See application file for complete search history.

(56) References Cited

U.S. PATENT DOCUMENTS

| 760,076 A | * | 5/1904 | Leonard | .................. | F24H 3/002 |
| | | | | | 392/373 |
| 3,086,187 A | * | 4/1963 | Duggan | .................. | H05B 3/565 |
| | | | | | 338/283 |

(Continued)

FOREIGN PATENT DOCUMENTS

EP   0 026 457 A2   4/1981

OTHER PUBLICATIONS

U.S. Appl. No. 15/832,082, filed Dec. 5, 2017, for "Electric Heating Device and PTC Heating Element for Such".
(Continued)

*Primary Examiner* — Thor S Campbell
(74) *Attorney, Agent, or Firm* — Boyle Fredrickson S.C.

(57) ABSTRACT

An electric heating device a PTC heating element, a platelet-type PTC element which has two main side surfaces and face side surfaces extending perpendicular to the main side surfaces, and a casing. The casing forms inlet and outlet openings for the fluid to be heated and forms a circulation chamber in which a heat emitting surface of the PTC heating element is exposed and is coupled in a heat conductive manner to the PTC element. The PTC element is contacted in an electrically conductive manner by way of electrical conductor tracks to different polarities. A high degree of efficiency and a high output is obtained in that the conductor tracks are contacted in an electrically conductive manner to face side surfaces of the PTC element.

24 Claims, 13 Drawing Sheets

(51) Int. Cl.

| | | |
|---|---|---|
| *F24H 1/12* | (2006.01) | |
| *H05B 1/02* | (2006.01) | |
| *H05B 3/24* | (2006.01) | |
| *F24H 1/10* | (2006.01) | |
| *B60H 1/22* | (2006.01) | |
| *F24H 9/18* | (2006.01) | |
| *H05B 3/04* | (2006.01) | |
| *F24H 3/04* | (2006.01) | |
| *H05B 3/02* | (2006.01) | |
| *H05B 3/14* | (2006.01) | |
| *H05B 3/06* | (2006.01) | |

(52) U.S. Cl.
CPC ............. *F24H 1/009* (2013.01); *F24H 1/103* (2013.01); *F24H 1/121* (2013.01); *F24H 3/0429* (2013.01); *F24H 9/1827* (2013.01); *F24H 9/1872* (2013.01); *H05B 1/0236* (2013.01); *H05B 1/0244* (2013.01); *H05B 3/02* (2013.01); *H05B 3/04* (2013.01); *H05B 3/06* (2013.01); *H05B 3/14* (2013.01); *H05B 3/141* (2013.01); *H05B 3/24* (2013.01); *B60H 2001/2278* (2013.01); *H05B 2203/02* (2013.01); *H05B 2203/023* (2013.01)

(56) References Cited

U.S. PATENT DOCUMENTS

| | | | | | |
|---|---|---|---|---|---|
| 3,414,704 | A | * | 12/1968 | Flanagan | H05B 3/0014 219/210 |
| 4,086,467 | A | * | 4/1978 | Grant | H05B 3/141 219/505 |
| 4,091,267 | A | * | 5/1978 | Grant | H05B 3/06 219/505 |
| 4,162,395 | A | * | 7/1979 | Kobayashi | F24H 3/0405 219/504 |
| 4,327,282 | A | * | 4/1982 | Nauerth | H05B 3/10 219/505 |
| 4,371,777 | A | * | 2/1983 | Roller | H05B 3/14 219/505 |
| 5,562,844 | A | * | 10/1996 | Bohlender | F24H 3/0405 219/505 |
| 5,822,675 | A | * | 10/1998 | Paquet | H05B 3/148 428/561 |
| 5,922,233 | A | | 7/1999 | Ohashi et al. | |
| 6,472,645 | B1 | * | 10/2002 | Bohlender | F24H 3/0429 219/505 |
| 6,965,732 | B2 | * | 11/2005 | Golan | A47J 27/16 219/505 |
| 7,667,165 | B2 | | 2/2010 | Bohlender et al. | |
| 7,777,161 | B2 | * | 8/2010 | Zeyen | F24H 3/0405 219/201 |
| 8,183,505 | B2 | | 5/2012 | Niederer et al. | |
| 8,569,663 | B2 | * | 10/2013 | Qin | H05B 3/265 219/505 |
| 8,698,051 | B2 | | 4/2014 | Twiney et al. | |
| 9,295,108 | B2 | | 3/2016 | Bohlender et al. | |
| 9,398,641 | B2 | | 7/2016 | Bohlender et al. | |
| 9,863,663 | B2 | * | 1/2018 | Kohl | B60H 1/2225 |
| 10,098,183 | B2 | | 10/2018 | Bohlender et al. | |
| 10,429,099 | B2 | * | 10/2019 | Bohlender | F24H 1/009 |
| 2005/0230377 | A1 | * | 10/2005 | Bohlender | B60H 1/2225 219/505 |
| 2007/0068913 | A1 | * | 3/2007 | Zeyen | F24H 3/0405 219/201 |
| 2008/0000889 | A1 | * | 1/2008 | Niederer | B60H 1/2221 219/205 |
| 2008/0099464 | A1 | | 5/2008 | Niederer et al. | |
| 2012/0085742 | A1 | * | 4/2012 | Niederer | H05B 3/24 219/201 |
| 2012/0085743 | A1 | * | 4/2012 | Clauss | H05B 3/24 219/202 |
| 2012/0087642 | A1 | * | 4/2012 | Bohlender | H05B 3/24 392/465 |
| 2013/0015178 | A1 | | 1/2013 | Twiney et al. | |
| 2016/0360573 | A1 | * | 12/2016 | Bohlender | H05B 1/0236 |
| 2016/0360574 | A1 | * | 12/2016 | Bohlender | H05B 3/06 |

OTHER PUBLICATIONS

U.S. Appl. No. 15/832,171, filed Dec. 5, 2017, for "Electric Heating Device".
U.S. Appl. No. 15/832,262, filed Dec. 5, 2017, for "Electric Heating Device".
U.S. Appl. No. 15/832,904, filed Dec. 6, 2017, for "Electric Heating Device".

* cited by examiner

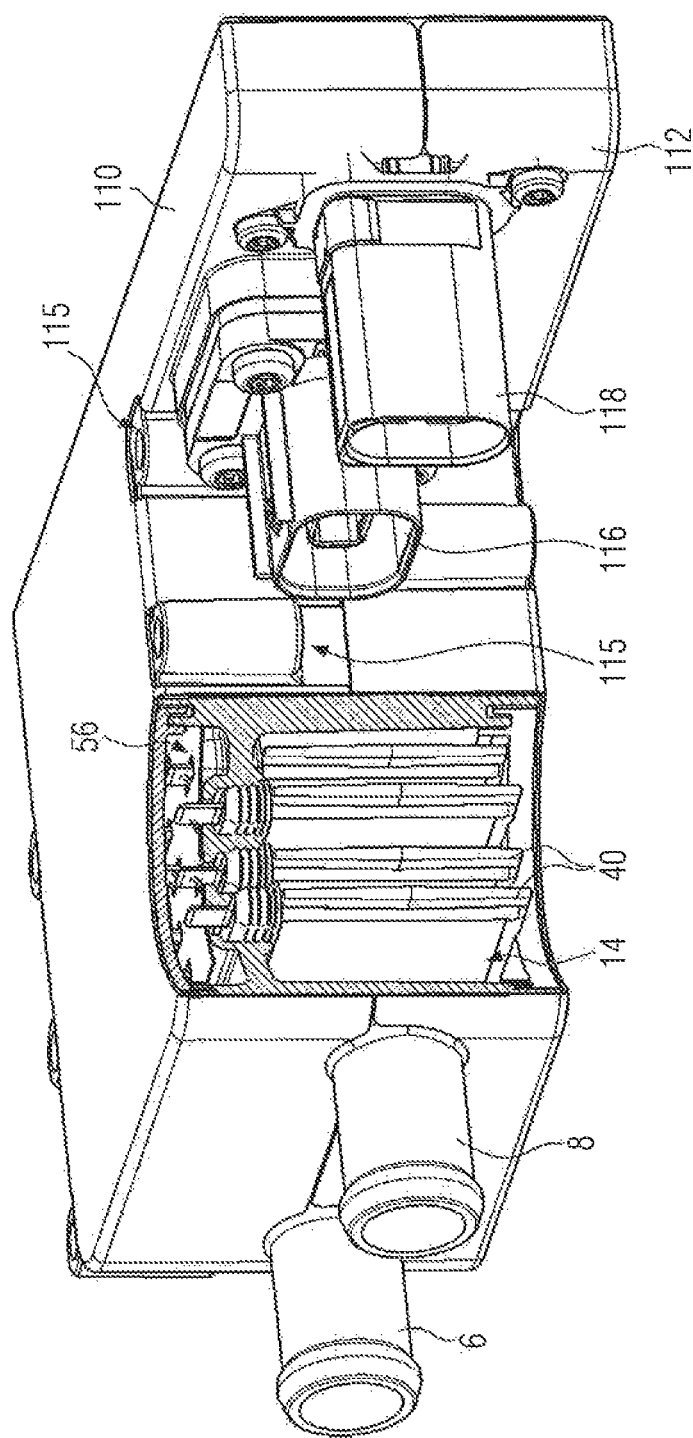

ELECTRIC HEATING DEVICE AND PTC HEATING ELEMENT OF AN ELECTRIC HEATING DEVICE

BACKGROUND OF THE INVENTION

1. Field of the Invention

The present invention relates to an electric heating device including a PTC heating element and a PTC element housed in a plastic casing,

2. Description of the Related Art

Such an electric heating device is known from EP 2 607 121 A1. Accommodated in a positioning frame forming the heating element casing are several PTC elements which are contacted on oppositely disposed main side surfaces by a contact plate, which are locked to the positioning frame. At one face side, connection ports project beyond the heating element casing and are integrally formed on the heating element casing and sealing sleeves made of Teflon with a labyrinth seal provided on the outer peripheral surface are drawn over the connection ports. Insulation layers formed from plastic film are respectively applied to the outer side of the contact plates facing away from the PTC elements.

Similar PTC heating elements are known from EP 1 253 808 A1 and EP 1 395 098 A1, respectively. In this prior art, the contact plate is overmolded at least on one side together with the insulation layer during the production of the heating element casing so that only the PTC elements are inserted into the opening of the frame-shaped heating element casing and are to be covered on the opposite side by the contact plate and the insulation.

Although such an embodiment represents a simplification in terms of production technology as compared to the previously described prior art, the design is still relatively bulky and complex. The present invention seeks to provide a PTC element, in particular, for the automotive industry. PTC heating elements are increasingly used in motor vehicles, in particular in the field of electric mobility. They must be inexpensive to manufacture and as light as possible. Furthermore, good heat decoupling of the heat generated by the PTC element is desired, since the PTC elements have self-regulating properties and can only be operated with poor efficiency if the heat generated by the PTC element is removed only inadequately.

SUMMARY OF THE INVENTION

The present invention aims to create an electric heating device that allows for high heat density and a high degree of efficiency.

To solve this problem, the present invention proposes an electric heating device that has a casing with inlet and outlet openings for the fluid to be heated. The fluid to be heated can be a gaseous fluid. It can also be a liquid fluid. The fluid is passed through a circulation chamber in which the heat-emitting surfaces of a PTC heating element are exposed. These surfaces are coupled to a PTC element in a heat conductive manner. The PTC element is contacted by electrical conductor tracks in an electrically conductive manner to different polarities. The electric heating device differs from previously known heating devices in that the conductor tracks are contacted in an electrically conductive manner on the face sides of the PTC element. Face sides are understood to be those surfaces which extend at a right angle to the main side surfaces of the PTC element. The PTC element typically has a platelet-like configuration with a main side surface whose main directions of extension are significantly larger than the direction of extension of the face side surfaces. The length or width, respectively, of the PTC element is greater by a factor of five, preferably by a factor of ten, than the thickness of the face side of the PTC element. Such a configuration has proven itself, at least for electric heating devices for motor vehicles, which the present invention is, in particular, geared toward. The heat of the PTC element is decoupled via the main side surfaces. Typically, one contact plate respectively abuts these main side surfaces in prior art electric heating devices.

According to the proposal of the present invention, contact is established on a side surface of the PTC element which extends at a right angle thereto. The PTC element can then be exposed in the circulation chamber either directly or only with interposition of an insulation layer. In the first case, the heat-emitting surface of the PTC element is formed by the PTC element itself. In the second case, the heat emitting outer surface is formed by the outer surface of the insulation layer. This insulation layer can be a ceramic plate.

Due to the face side contact of the PTC element, a plurality of PTC elements can be arranged relatively close to each other in the circulation chamber, while forming a channel for the fluid to be heated. A contact plate provided on both sides of the PTC element is omitted. The PTC heating elements are then less thick. The PTC heating elements are preferably used as heating ribs directly in the circulation casing of a water heater. A high heat density can be obtained in this way with the electric heating device. Due to the absence of contact plates, which are provided parallel to the main side surfaces of the PTC element, heat can be dissipated via these main side surfaces of the PTC element better than in prior art. The heat is typically introduced directly into the insulation layer and dissipated by way of heat conduction to the outer surface thereof, which is exposed in the flow of the fluid to be heated.

The present invention also proposes a PTC heating element with a PTC element and electrical conductor tracks which can be associated with different polarities and are in contact with the PTC element in an electrically conductive manner. The conductor tracks are each formed by a sheet metal strip. Each of the sheet metal strips is contacted directly to the PTC element, preferably at the face side, i.e. abuts directly against a metallic layer of the PTC element. For this purpose, the sheet metal strip preferably comprises a contact ridge which preferably abuts solely against the face side surface of the PTC element, i.e. does not extend over the main side surfaces of the PTC element. The sheet metal strip preferably also forms a contact strip. This contact strip is configured as a male plug element of an electrical plug connection, so that the PTC element in an electric heating device can be electrically connected by plugging it into a female plug element holding fixture. The contact ridge is preferably narrower in the width direction of the PTC element than the contact strip. The PTC heating element can then be designed having a width that is only insignificantly larger than the width of the PTC element.

According to a preferred further development of the present invention, the two contact strips of the conductor tracks protrude over the PTC element at a single face side, namely in the direction of longitudinal extension of the associated contact ridge. The contact strips partially protruding the PTC element are directed toward each other transversely to this direction of extension. The contact ridges are formed to be narrower in the width direction than the contact strips, which, however, does not lead to an additional width of the PTC heating element because the contact strips are directed towards each other. In other words, the contact strips partly project over the PTC element in the width direction.

At least the contact ridges, regularly the two sheet metal strips overall, are preferably less thick than the PTC element. The sheet metal strips arranged at the face side of the PTC element, preferably adhesively bonded thereto, can therefore be protruded, at least at the height of the PTC element, by an insulation layer placed on the main side surface of the PTC element. This insulation layer can then terminate approximately at the height of the contact ridges and there be connected to a plastic frame forming a heating element casing of the PTC heating element, preferably connected by overmolding plastic material forming the plastic frame. This plastic material is preferably elastomeric material, though typically no thermoplastic elastomer, but rather crosslinked elastomer.

The contact strips themselves can be designed with reduced thickness as compared to the thickness of the contact ridges. Contacting the contact strips is typically effected on the surface of the contact strip that are disposed in the plane of the main side surface of the PTC element.

In view of the small width of the PTC heating element, the sheet metal strips form an edge surface which is flat along the entire length of the sheet metal strip. This edge surface is the outer surface of the sheet metal strip that is disposed oppositely to the contact surface. The contact surface of the sheet metal strip is the surface that directly abuts against the PTC element and introduces the power current into the PTC element at the face side. Due to the flat edge surface, a relatively narrow heating element casing can be formed which promotes a compact arrangement of the PTC elements in the electric heating device and thereby high heat density.

As already mentioned, the heating element casing is preferably formed by a plastic frame that surrounds the PTC element in its entirety. The plastic frame preferably surrounds all edge surfaces of the insulation layer. Preferably, the sheet metal strip is also largely embedded in the plastic frame. Only the contact strips protrude beyond the plastic frame on one side.

Preferably, the PTC heating element according to the invention has a heating element casing formed from an elastomer. The elastomer is preferably no thermoplastic elastomer, but a crosslinked elastomer which is not fusible when supplied heat. This heating element casing seals the at least one PTC element circumferentially and encloses it. A male plug element of a plug connection is preferably formed by the heating element casing.

The elastomer preferably forms a sealing collar circumferentially sealing the contact strips. This sealing collar is configured as a plug connection adapted to holding the PTC heating element in the direction of insertion.

According to a preferred embodiment of the present invention, the sealing collar is configured as being conically tapered in the direction of the free ends of the contact strips. The sealing collar can be provided as a labyrinth seal with several conically tapered segments. The individual segments are there provided one behind the other in the longitudinal direction of the contact strip and are sized, for example, such that all segments have an identical maximum width. A stop can be formed by the elastomeric material of the heating element casing at the end of this sealing collar and interact axially and/or radially with a mating surface formed by the partition wall. The stop is typically disk-shaped.

The sealing collar can be formed entirely from the elastomeric material. In this case, the sealing collar is only penetrated by the sheet metal material forming the contact strip. However, the sealing collar can also be provided as a relatively thin layer on a plug element which is penetrated by the sheet metal forming the contact strip. This plug element can be formed, for example, from plastic material which is connected to the sheet metal material by way of overmolding it. A plug element can there hold two contact plates at a predetermined distance and thus join them. The plug element thus prepared can be inserted into an injection mold together with the contact plates, which are preferably already electrically contacted to the PTC element, in order to form the heating element casing by way of injection molding and to connect it to the PTC element, preferably together with an insulation layer that is applied directly on the outer side onto the PTC element.

It is proposed by a preferred development of the present invention to form the casing as the contact plates and the at least one PTC element only circumferentially enclosing frame [sic]. The frame forms oppositely disposed frame openings behind which the PTC element is exposed. Preferably the insulation plate, which is preferably formed by a ceramic plate, is exposed in at least one of the frame openings. The PTC element is typically located directly behind the insulation plate. Contacting the PTC element is effected preferably on the face side, which promotes good decoupling of the heat generated by the PTC element.

The frame is shaped as a comparatively thin component so that it occupies only little space within the circulation chamber. This provides the possibility of arranging the individual PTC heating elements relatively close to each other within the circulation chamber. The sealing collar alone projects not insignificantly over the thickness of the frame. According to a preferred development of the present invention, it is proposed to form the frame with a density [sic] of no greater than 0.5 of the thickness of the sealing collar.

Furthermore, oppositely disposed main side surfaces of the PTC element are preferably largely not covered by the elastomer forming the heating element casing. This means that at least 85% of a main side surface of the PTC element are exposed within the frame opening and not covered by the elastomeric material. It is accordingly proposed that mutually oppositely disposed main side surfaces of the PTC element are not predominantly not covered by a contact plate. Contacting the PTC element(s) is the therefore effected predominantly, preferably exclusively, via the face side of the PTC element(s). The insulation layer typically abuts directly against the PTC element. Particularly preferably, the PTC element is protruded by the oppositely disposed insulation layers. The contact plate is typically that element of the PTC heating element which forms the contact strip and is connected directly to the PTC element in an electrically conductive manner as an electrode, preferably adhesively bonded thereto.

The insulation layers can be formed from a single-layer or multi-layer insulation plate covering substantially the entire main side surface of the PTC element, regularly overlapping it, i.e. projecting over the PTC element at least on one side, preferably on several sides and, particularly preferably, entirely. The insulation layer can be formed, for example, by a combination of a ceramic plate and a plastic plate. However, the insulation layer can also be formed, for example, by coating the PTC element with electrically insulating material. In this case, the PTC element forms the substrate, and the outer surface of the insulation layer is usually exposed within the plastic frame such that a good heat output of the heat generated by the PTC element arises. An example of the coating is a ceramic coating which is applied by way of PVD or CVD onto the PTC element as a substrate. An insulation layer applied as an insulating coating onto the main side surface of the PTC element can be combined with an insulation plate made of ceramic and/or plastic material.

Configured in such a manner, the contact plate forms a sheet metal strip. The sheet metal strip preferably comprises a contact ridge abutting against the PTC element at the face side and forms a further contact strip. The contact strips of the two sheet metal strips which abut against the oppositely disposed face sides of the PTC element are each widened as compared to the associated contact strip in the width plane of the PTC element. The contact strips typically project over the PTC element in the length and width directions and are directed toward each other.

According to a preferred development of the present invention, the plastic frame is provided with a tapered abutment ridge on its outer side. This abutment ridge is formed to be tapering in the thickness direction of the plastic frame. The abutment ridge is commonly provided at least on a frame tie of the plastic frame. Particularly preferably, the abutment ridge is provided on three successive outer sides or frame ties of the plastic frame. On the side of the plastic frame which is disposed opposite to the contact surfaces, the bottom abutment ridge forms a seal against the base of a heating device casing. The edge-side abutment ridges, which extend at a right angle thereto, serve to seal against a lateral wall of the heating device casing. The PTC elements can be provided in an alternately staggered manner so that each first PTC heating element abuts against, for example, a left side on the heating device casing, whereas every second PTC heating element abuts against the opposite right casing wall. This forms a meandering flow channel in a simple manner. The edge-side abutment ridges seal the PTC heating element against the heating device casing. The abutment ridge is preferably formed as one piece, i.e., is an integral component of the injection-molded plastic frame. In particular, the lower abutment ridge can also be used as a compression element in order to secure a specific installation position by elastic pretensioning force after installation of the PTC heating element according to the invention into the heating device casing. This securing can be mechanical securing for mechanically fixing the PTC heating element to the heating device casing. However, the pretensioning force can also or additionally provide a reliable contact of the contact strips in that the PTC heating element is pretensioned.

BRIEF DESCRIPTION OF THE DRAWINGS

Further details and advantages of the present invention shall become apparent from the following description of an embodiment in combination with the drawing, in which:

FIG. 9 shows a perspective and partially exposed side view of the second embodiment with a shielding provided on the plastic casing;

DETAILED DESCRIPTION

1. Basic Configuration of the Heating Device

Figure 1:
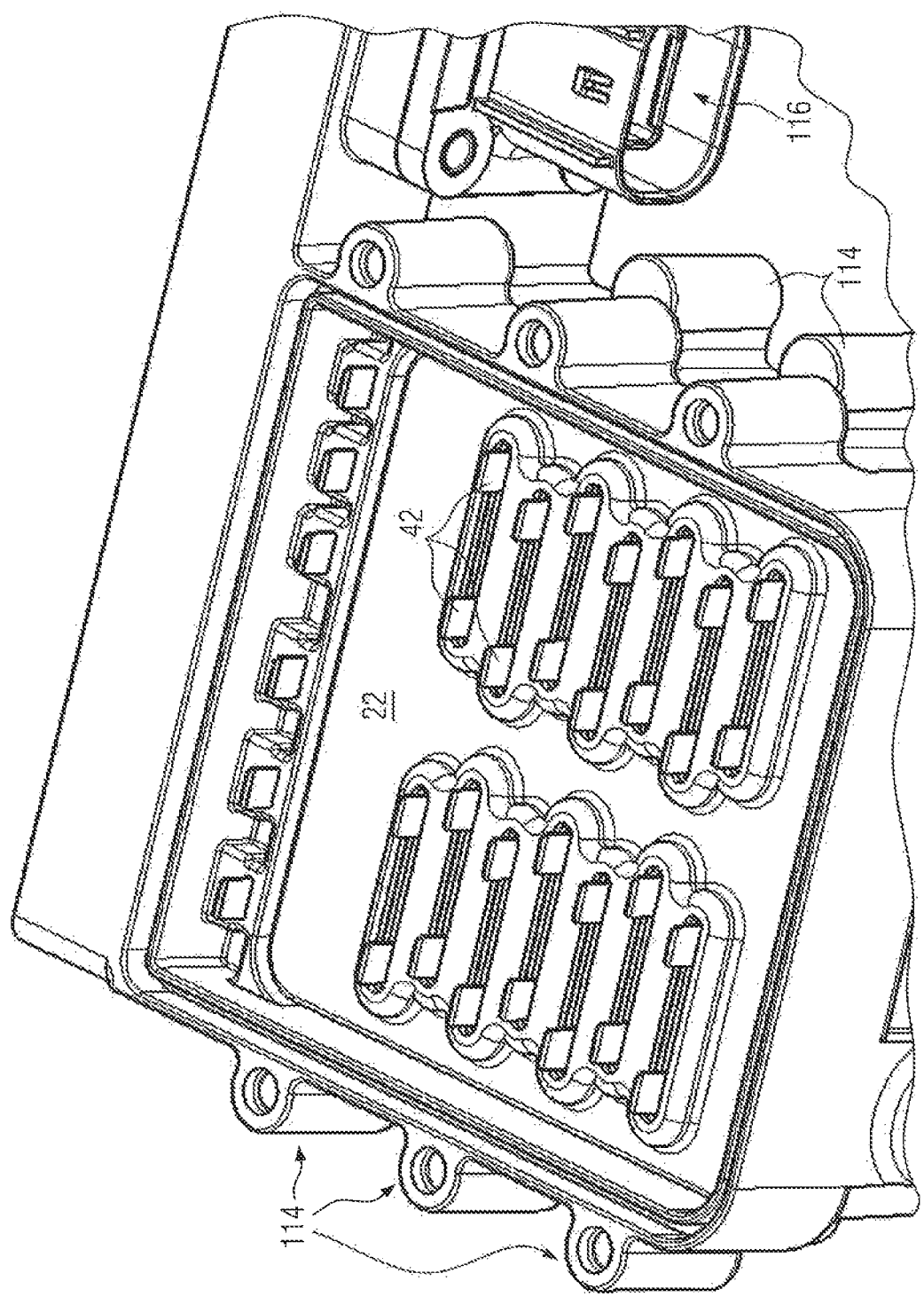
FIG. 1 shows a perspective top view onto a first embodiment of a casing.

FIG. 1 shows a perspective top view of a casing, designated by reference numeral 2, of an electric heating device configured as a water heater. The casing 2 has a casing tub element 4 made of plastic material. This plastic material is presently duroplastic material. The casing 2 forms an inlet port 6 and an outlet port 8 which are presently embodied formed integrally on the casing tub element 4. The ports 6, 8 are designed as hose connection ports and form an inlet opening 10 and an outlet opening 12, respectively, to a circulation chamber designated by reference numeral 14. The circulation chamber 14 is divided into two heating chambers, of which only the heating chamber 16 shown in the front of the representation can be seen in FIGS. 1 and 2. The circulation chamber 14 is divided by a dividing wall 20, which is formed integrally on the casing tub element 4 and protrudes inwardly from the base 18 thereof, and which is continued by a further dividing wall 24 identified by reference numeral 24 and formed on a cover plate designated by reference numeral 22. On the side disposed opposite to the two nozzles 6, 8, the two heating chambers 16 are connected to one another by way of a connection channel which can be seen in the second embodiment of a casing 2 according to FIG. 5 and is designated there by reference numeral 26. This connection channel 26 is separated from the heating chamber 16 by a channel wall segment 28, which is integrally formed on the cover plate 22 and extends at a right angle to the partition wall 20, and a channel wall segment 30 which projects from the base 18 of the casing tub element 4.

The cover plate 22 is made of plastic material. In the present case, the cover plate 22 is made of duroplastic material. In principle, the use of duroplastic material for producing the casing 2 or parts thereof has the advantage that duroplastic material exhibits relatively high temperature stability of about 150° C. and also shows no brittleness at temperatures of −40° C. This results in better temperature resistance for a casing formed entirely or partially from duroplastic material, for requirements which arise during heating operation and when operating vehicles in arctic regions. However, duroplastic material is also preferable over thermosetting materials because duroplastic material has better resistance against leakage current than thermosetting material.

Figure 4:
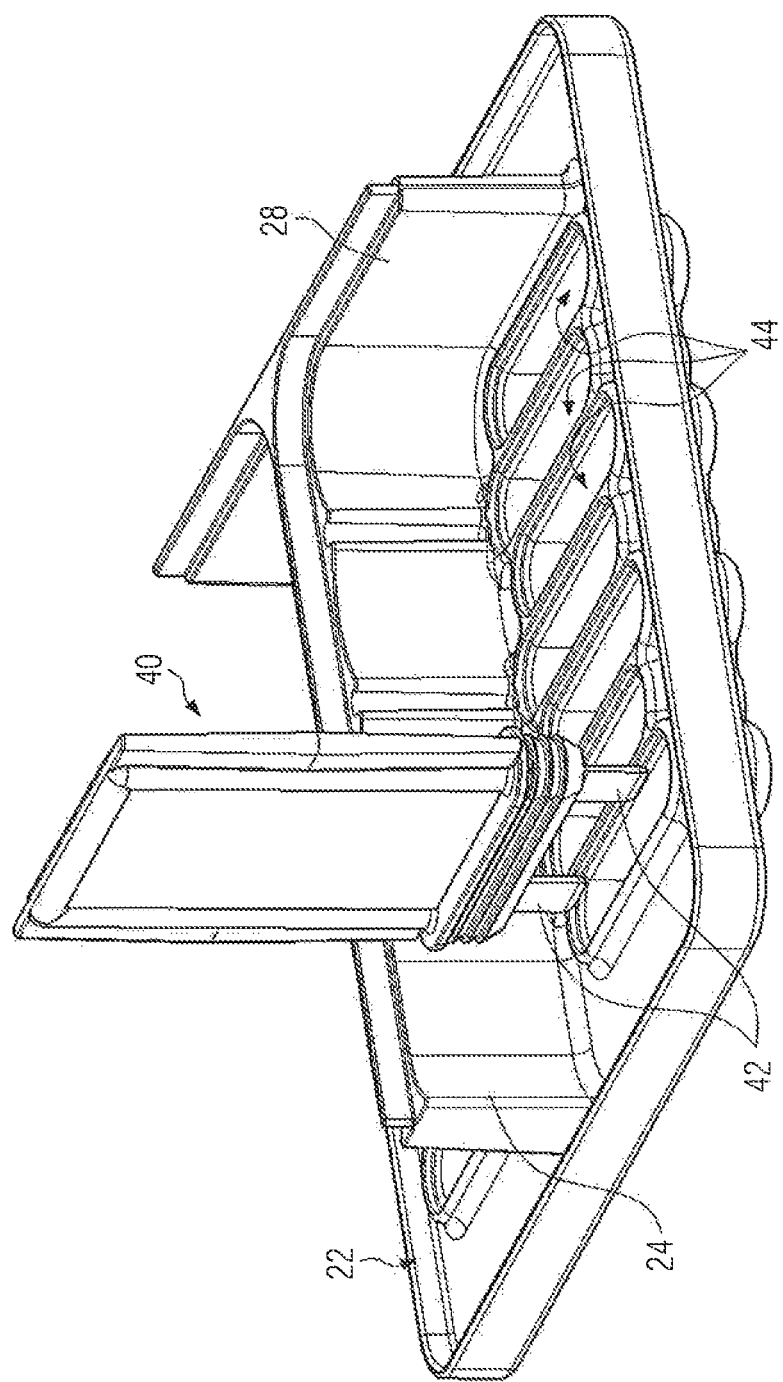
FIG. 4 shows the cover plate shown in FIG. 3 when being fitted with a PTC heating element.

FIG. 4 shows the cover plate 22 without the casing tub element 4. The cover plate 22 has a circumferential edge 32 which interacts with a circumferential groove 34 formed on the casing tub element 4. This groove 34 is filled with adhesive, in the present case epoxy glue, before the edge 32 penetrates into the groove 34 in order to adhesively bond the cover element 22 to the casing tub element. The segments 24 and 28 are joined to the corresponding wall elements 20 and 30, respectively, of the casing tub element 4 in the same way. The circulation chamber 14 is then sealed in a fluidly tight manner between the base 18 of the casing tub element 4 and the cover element 22 and circumferentially surrounded by walls formed by the casing tub element 4 and extending at a right angle to the base 18 thereof.

Figure 3:
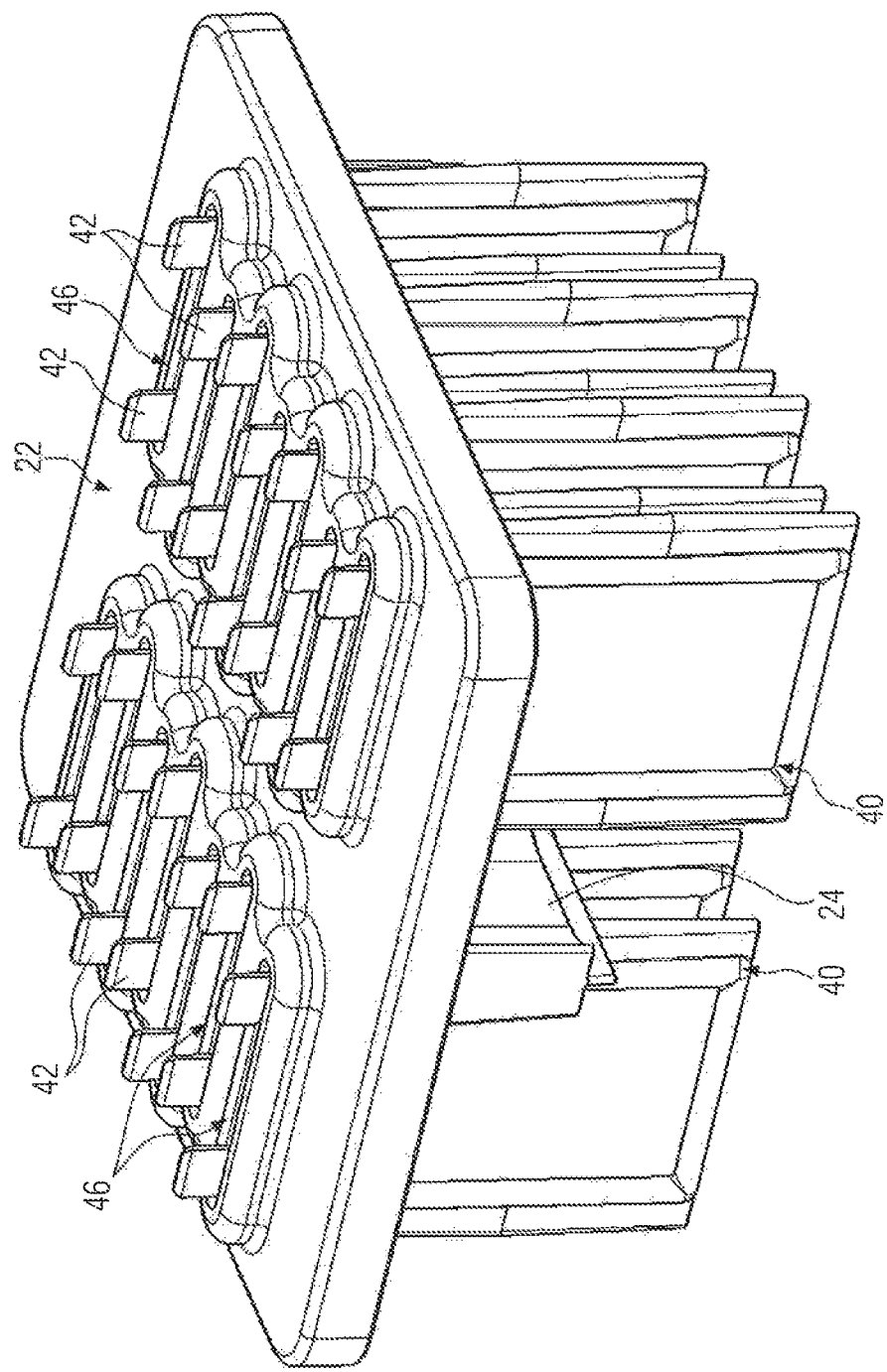
FIG. 3 shows a cover plate 22, provided in the first embodiment, in isolated representation together with PTC heating elements.

Prior to assembly, the cover element 22 is fitted PTC heating elements 40 in the manner shown in FIGS. 3 and 4. For this purpose, the PTC heating elements 40 are inserted on the connection side, i.e. where the PTC heating elements 40 each have two contact strips 42, into female plug element holding fixtures 44 which are integrally formed in the cover plate 22. These plug element holding fixtures 44 are each provided with a longitudinal slot 46 which is penetrated by the contact strips 42 (cf. FIGS. 1, 3). A longitudinal slot 46 is an example of a through-hole opened in the cover plate 22 as an example of an inner wall.

FIG. 4 illustrates the insertion of the PTC heating element 40 into the plug element holding fixture 44. For the plug connection established after insertion, the PTC heating element 40 has a sealing collar 48 which is configured to be adapted to the dimension of the plug element holding fixture 44 and is formed from elastomeric material which is sealingly injected into the plug element holding fixture 44, so that the slots 46 are sealed fluidly tight against the circulation chamber 14. Furthermore, by injecting the material forming the sealing collar 48, the PTC heating element 40 is held frictionally engaged within the plug element holding fixture 44, namely, also in the direction of insertion, which corresponds to the direction of longitudinal extension of the contact strips 42. Joined in this manner, the PTC heating elements 40 adhere to the cover plate 22 even if the latter with the plug element holding fixtures 44 is oriented downwardly, as shown in FIG. 3.

2. Casing Base Member

Figure 5:
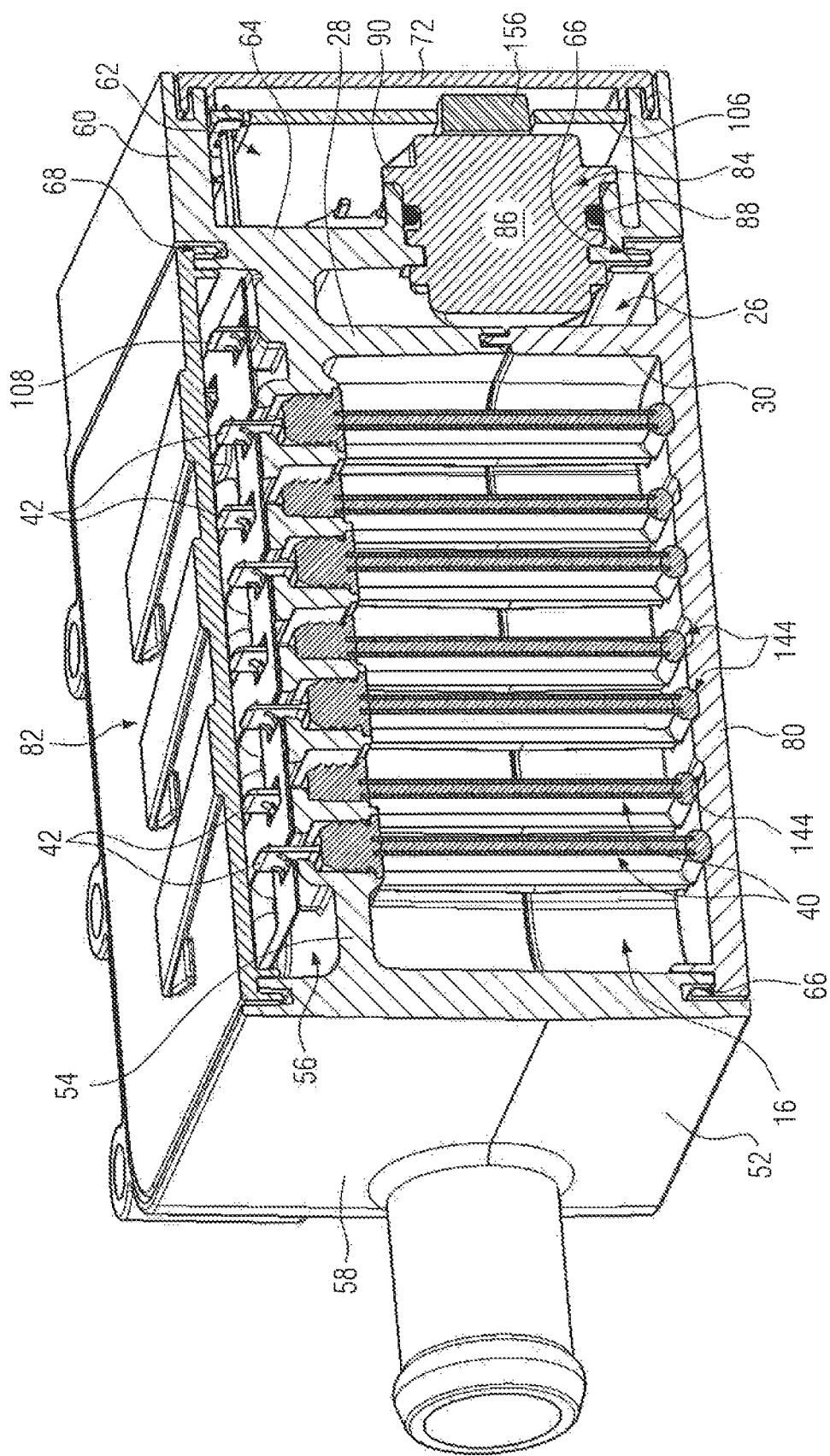
FIG. 5 shows a perspective sectional side view of a second embodiment of the present invention.

FIG. 5 in a sectional view illustrates the nature of an embodiment of a casing base member which is designated by reference numeral 50. The casing base member 50 forms walls that are designated by reference numerals 52 and surround the circulation chamber 16 circumferentially, i.e. the heating chambers 16 and the connection channel 26. The cover plate 22, which is provided as a separate component in the previously described embodiment, is presently embodied integrally with the casing base member 50 and presently also forms a partition wall 54, like in the first embodiment, which separates the circulation chamber 16 from a connection chamber 56 in which presently all contact strips 42 of all the PTC heating elements 40 are exposed. Walls designated by reference numeral 58 and surrounding the connection chamber circumferentially are also formed by the casing base member 50. Finally, in the extension of the ports 6, 8 and in this direction behind the circulation chamber 16 or the connection chamber 56, respectively, walls 60 are formed by the casing base member 50 and surround a control chamber 62 circumferentially. A control chamber base, designated by reference numeral 64, from which the walls 60 rise, is in part formed by one of the walls 52 and one of the walls 58. In a cross-sectional view extending parallel to the direction of extension of the nozzles 6, 8, the casing base member therefore accordingly appears to have an H-shaped cross-section with a U adjoining at one side of the H. The casing base member 50 is made of plastic material and configured as an integrally formed component. The casing base member 50 is presently formed from duroplastic material.

The walls 52, 58, 60 are each provided with a circumferential groove 66, 68, 70 on the face side. The function of these grooves 66, 68, 70 is illustrated in particular by FIG. 6. A cover element 72 to the control chamber 62 is there illustrated, which is configured as a substantially flat plate with a circumferential rim 74. This rim 74 engages in the associated groove 70 and displaces adhesive applied there (in the present case, epoxy adhesive). The rim 74 forms an outer edge of a mating groove 76 which is formed on the cover element 72 and is defined on the inside by an inner ridge 78. A kind of labyrinth seal is formed thereby, into which displaced adhesive can ingress, which has been introduced either into the groove 70 or the mating groove 76 prior to the installation of the cover element 72. Correspondingly, the casing cover 80 to the circulation chamber 14 and 82 to the connection chamber 56, respectively, is formed on the edge side and attached to the casing base member 50 and sealed against it.

Figure 6:
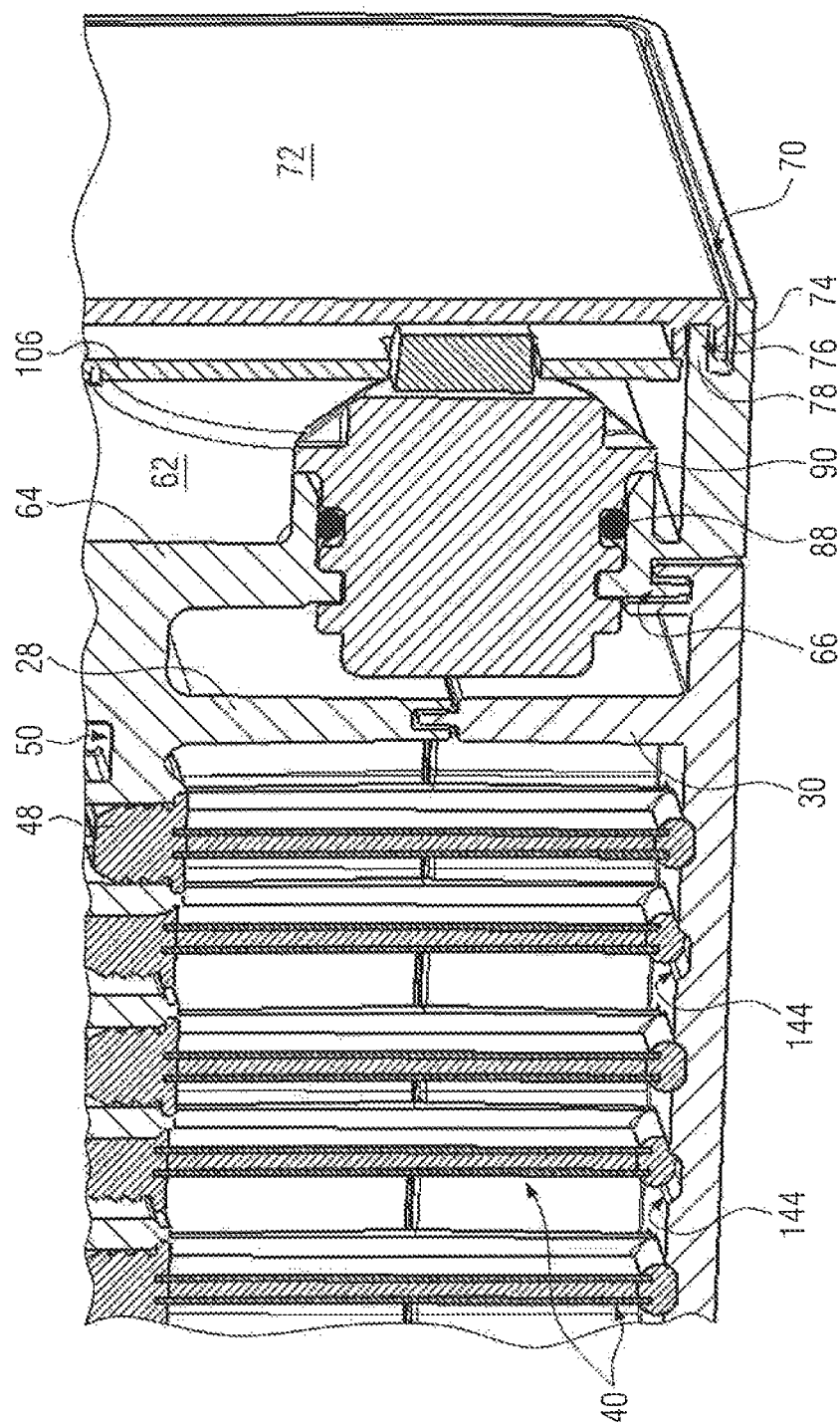
FIG. 6 shows detail VI according to the representation in FIG. 5.

As also illustrated in FIG. 6, the control chamber base 64 is provided with a passage opening 84 into which a cooling element 86 is introduced. A sealing ring 88 is provided between the cooling element 86 and the inner circumferential wall of the passage opening 84 for sealing the circulation chamber 14 against the control chamber 62. On the control casing side, the cooling element 86 forms an annular stop 90 which abuts against the face side end surface of the passage opening 84, which is extended in the direction towards the control chamber 62 as a projecting collar 92 and formed by the material of the casing base member 50.

Figure 7:
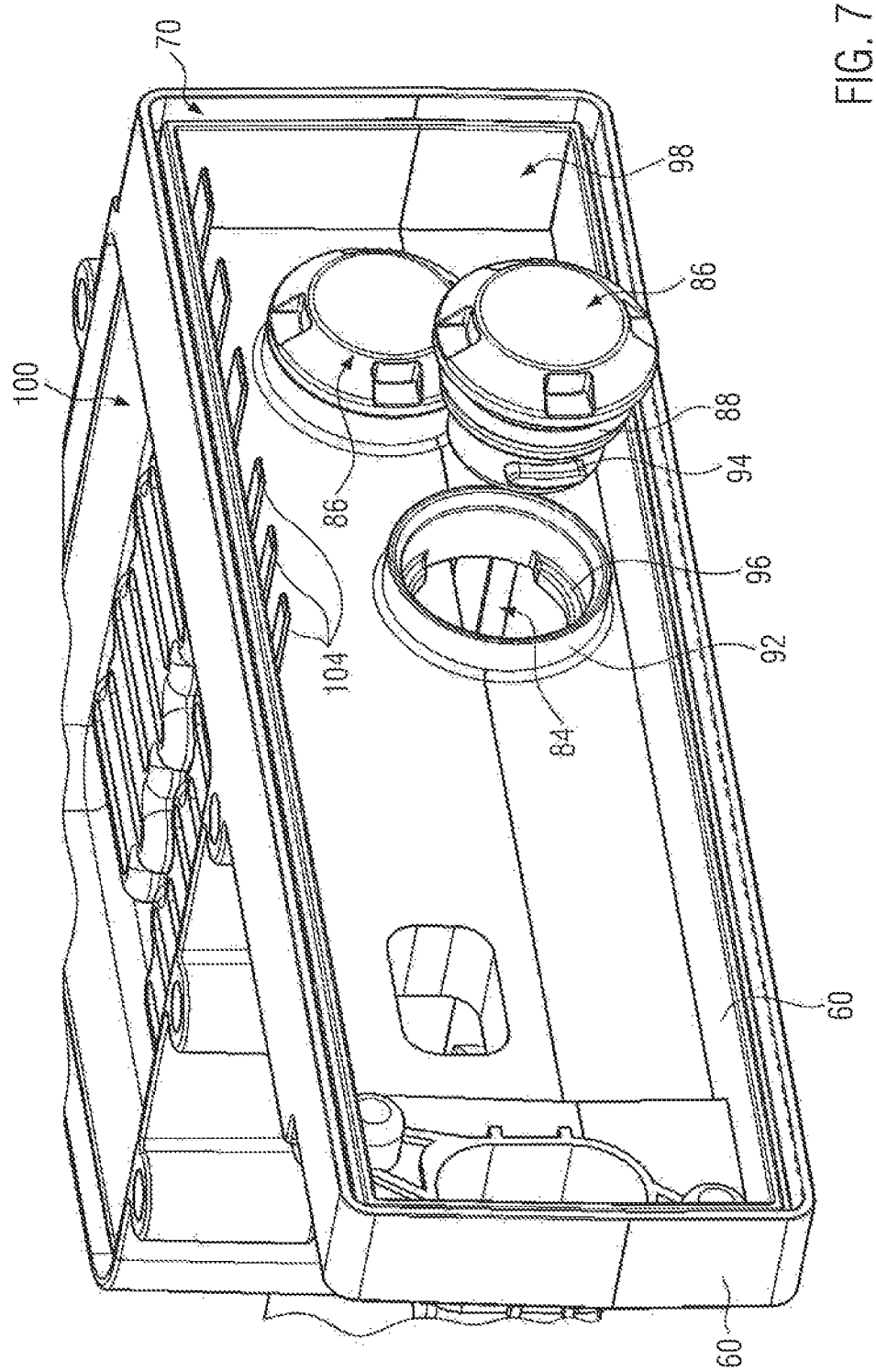
FIG. 7 shows a perspective view into the control tub of the second embodiment.

As shown in FIG. 7, the outer circumferential surface of the cooling element 88, which is formed substantially cylindrical at least in the direction toward the circulation chamber 14, is protruded circumferentially on opposite sides by locking projections 94, which interact with locking catches 96, which at the inner circumference project over the substantially cylindrical passage opening 84 to form a bayonet lock with which the cooling element 86 is fixed with respect to the casing base member 50. The sealing ring 88 can be configured such that it holds this lock subject to axial and/or radial pretension. In addition, the control chamber base 64 can be provided with depressions adjacent to the mouth of the passage opening 84 on the sides of the circulation chamber 14 into which the locking projections 94 engage and which hold the cooling element 86 in a positive-fit anti-rotational manner in order to prevent the bayonet lock 94, 96 from being released unintentionally.

FIG. 7 provides a view into a control casing tub which is formed by the control chamber base 64 and the walls 60 and which is closed by the cover element 72 in the final assembled state.

FIG. 5 shows, above the partition wall 54, a connection tub 100 formed by the partition wall 54 and the walls 58. On the side which is in the representation according to FIG. 5 located therebeneath, a circulation pan 102 is formed by the partition wall 54 and the walls 52 through the casing base member 50. The casing base member 50 forms substantially all the chambers 14, 56, 52, which only need to be covered by the cover elements 72, 80, 82, in order to create an electric heating device which is operational and formed as a lightweight plastic part.

3. Sealingly Overmolded Current Bar

Figure 8:
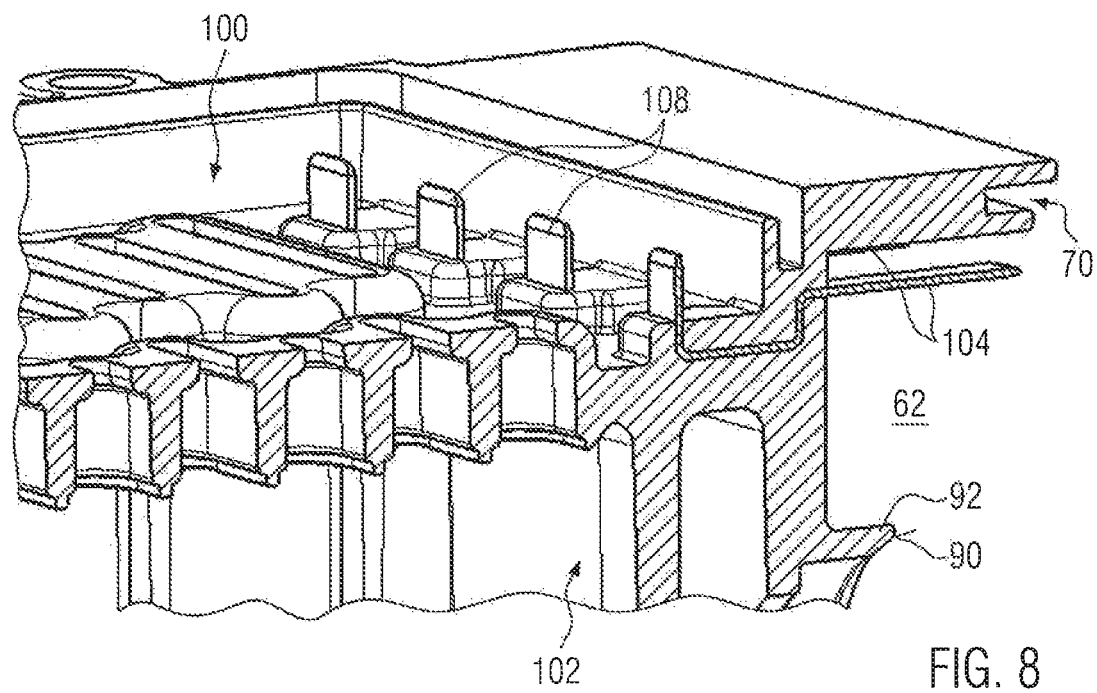
FIG. 8 shows a perspective longitudinal sectional view taken along line VIII-VIII according to the representation in FIG. 7.

FIG. 8 illustrates a current bar 104 which is provided as a conductor track between the connection chamber 56 and the control chamber 62. The current bar 104 is bent twice by 90° in opposite directions at the height of the control chamber base 64 and within the latter. One end of the current bar 104 located within the control chamber 62 is configured as a plug connection for a printed circuit board assembly 106 provided within the control chamber (cf. FIG. 6). The other end is provided within the connection chamber as a connection strip 108 for a distributor plate provided inside the connection chamber and omitted in the previous figures. The distributor plate can be configured like in EP 2 505 931 A1. Several connection strips 108 are exposed within the connection chamber 56 by several current bars 104 provided in an identical manner. The connection strips 108 extend parallel to the contact strips 42 to the PTC heating elements. The distributor plate can there be lowered into the connection chamber from above in order to contact all contact and connection strips 42, 108.

4. Shielding

The sheet metal strips 128 are formed from punched sheet metal and represent embodiments of contact plates.

FIG. 9 shows a partial sectional view of the casing 2 described above. This plastic casing 2 is surrounded by two metal shells 110, 112 which form a shielding for the electric heating device so that electromagnetic radiation cannot be emitted from the latter. The dividing plane of the metal shells 110, 112 is located approximately at the center height of the two nozzles 6, 8. The metal shells 110, 112 substantially completely surround the casing 2. Only attachment projections 114 formed on the plastic casing 2 project outwardly beyond the metal shells 110, 112 and through recesses 115 formed on the metal shells 110, 112 and through the shielding formed thereby. Furthermore, connector casings protrude which are designated by reference numerals 116 and 118, where the connector casing 116 is presently provided for the high-voltage power current and the connector casing 118 for the low-voltage control lines. The embodiment shown in FIG. 9 allows for the attachment of the casing 2 by way of the attachment elements 110 made of plastic material. In using them, the requirement to fasten the casing 2 at the desired location within a motor vehicle can be complied with in a simple manner. In FIG. 9, the metal shells 110, 112 are formed to be substantially end-to-end. They can just as well be formed from a perforated plate without the effect of the metal shells 110, 112 as an EMC protection being lost.

5. PTC Heating Element as a Frame Element

Figure 10:
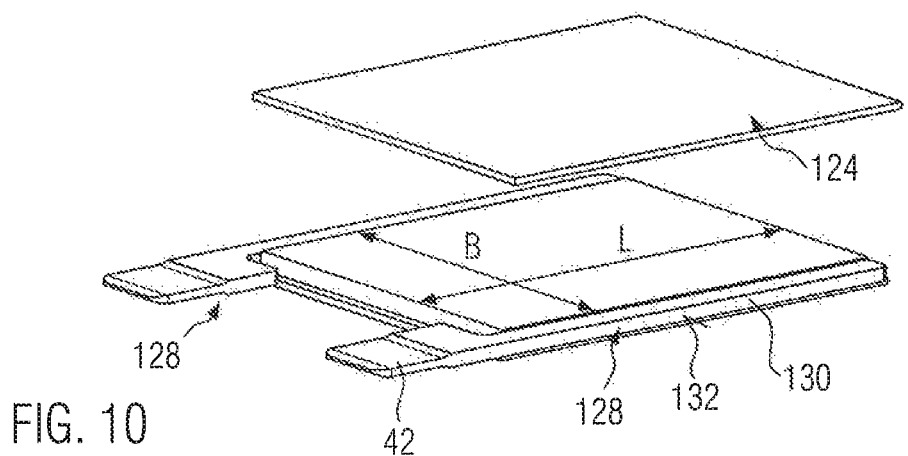
FIG. 10 shows a perspective side view of parts of the PTC heating element.

FIG. 10 shows a PTC element 120 which is provided with an insulation layer 124 on its oppositely disposed main side surfaces 122. The insulation layer 124 is presently a ceramic plate made from aluminum oxide. However, it can also be applied as a coating onto the PTC element 120 or as a combination of a coating with a single or multiple layer insulation coat. The PTC element 120 is designed as a platelet having a width B or a length L, respectively, that is greater by the factor of at least 10 than the thickness D which corresponds to the distance between the two main side surfaces 122. Sheet metal strips 128 substantially extending in the direction of the length L are provided on mutually oppositely disposed face side surfaces 126 and are glued to the PTC element 120 and are connected in an electrically conductive manner to a surface metallization of the PTC element 128, which can be applied as a protection by way of PVD or CVD. These sheet metal strips each form conductor tracks to different polarities with which the PTC element 120 is energized. The sheet metal strips 12 consist of a contact ridge 130 which is relatively narrow and the contact strip 42 which is widened in relation to the contact ridge 130 in the direction of the width B.

Figure 11:
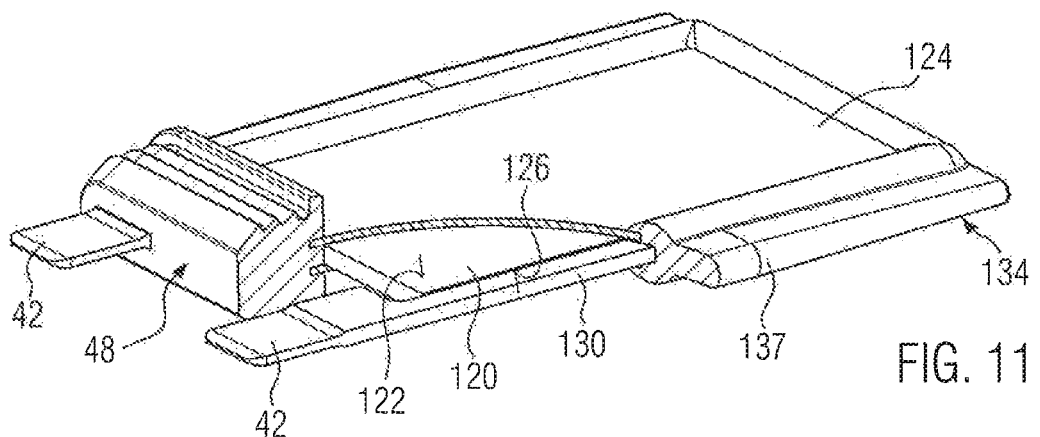
FIG. 11 shows a partially exposed perspective side view of parts of the PTC heating element.
Figure 12:
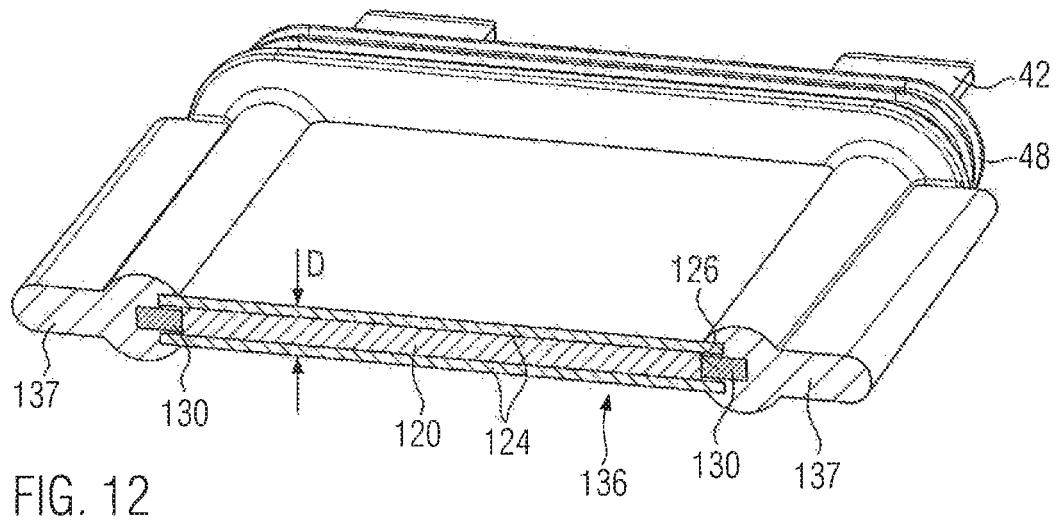
FIG. 12 shows a perspective cross-sectional view of the PTC heating element.

The contact ridges 130 presently form the electrodes to the PTC element are electrically connected to the metallization of the PTC element 120. The thickness of the contact strip 42 is smaller than the thickness of the contact ridge 30. Its thickness is in turn smaller than the thickness D of the PTC element. The sheet metal strip 128 is provided such that it does not project over the main side surfaces 122 of the PTC element 120 at any point. As can be seen in particular in FIGS. 11 and 12, the insulation layers 124 project laterally beyond the PTC element 120. The insulation layers 124 accordingly have a base area which is larger than the base area of the main side surfaces 122 of the PTC element 120. Accordingly, the outer edges of the insulation layers 124 receive the contact ridge 130 between themselves on both sides (see FIG. 12). Each contact ridge 130 is glued to one of the oppositely disposed face side surfaces 126. The insulation layer 124 is likewise glued to the PTC element 120. The insulation layer 124 abuts directly against the PTC element. One of the insulation layers 124 therefore directly contacts the associated main side surface 122 of the PTC element.

The outer side of the respective sheet metal strips 128 is completely flat and extends strictly in the direction of the length L. The contact strips 42 are in the width direction formed larger than the contact ridge 130 and project over the PTC element 120 towards each other (cf. FIG. 10). The contact strip 42 is also thinner than the contact ridge 130.

The region of the sheet metal strip 128, which is broadened as compared to the contact ridge 130, is received in a heating element casing 134 surrounding the PTC element 120 in a frame-like manner. This plastic frame 134 encloses the circumferential edges of the insulation layers 124. The edge surfaces 132 are also sealed by the material forming the plastic frame 134. The plastic frame 134 is formed as an elastomeric plastic frame 134 by overmolding elastomeric material. With the finished PTC heating element 40, only the contact strips 42 project over the plastic frame 134 on a face side. All other functional parts of the PTC heating element 40 used for heat generation and current conduction are accommodated within the plastic frame 134. As illustrated in particular by FIG. 12, the PTC element 120 with its oppositely disposed main side surfaces 122 is located behind frame openings which are designated by reference numeral 136 and are formed by the plastic frame 134. These frame openings 136 are covered by the insulation layer 124. Almost no covering of the plastic frame 134 with the main side surfaces 122 of the PTC element presently arises so that this exposes approximately 100% of its main side surfaces 122 behind the frame openings 136.

The frame ties of the plastic frame 134 protruding at a right angle from the sealing collar 48 are each provided with abutment ridges 137 on the edge side. The abutment ridges 137 are designed in the manner of tapered slats which have a thickness that tapers as compared to the thickness of the plastic frame 134. As can be seen, for example, in FIG. 6, the PTC heating elements 40 are each provided slightly staggered one behind the other such that each first PTC heating element 40 abuts against the wall of the casing 2 on the left side and is sealed there by the abutment ridge 137 which sealingly abuts against a border wall of the circulation chamber 14. Therefore, no fluid can flow past the PTC element 40 on this side, but it can flow past the PTC heating element that is in the flow direction located upstream or downstream. The latter, in turn, with its abutment ridge 137 abuts against the wall defining the circulation chamber 14 the opposite side and redirects the flow channel there. A meandering flow channel is thus formed by the alternating arrangement of the PTC heating elements 40.

6. Plug Connection

Figure 13:
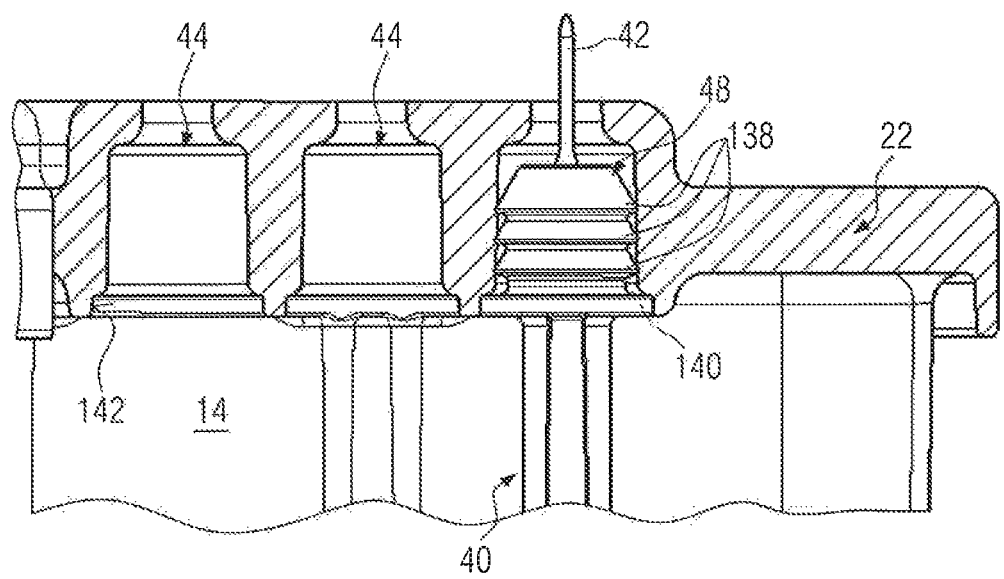
FIG. 13 shows a longitudinal sectional view through the cover plate according to FIGS. 3, 4 with a single PTC heating element accommodated therein.

The plastic frame 134 further forms the previously described sealing collar 48, which is provided with segments 138 tapering toward the free end of the contact strips 42 (cf. FIG. 13). Three of these segments 138 are presently provided one behind the other in the direction of longitudinal extension of the contact strip 42. An annular stop 140 is formed by the heating element casing 134 between the frame opening 136 and these segments 138. As illustrated by FIG. 13, this stop is in sealing abutment against a cylindrical mating surface 142 formed by the female plug element holding fixture 44.

Figure 2:
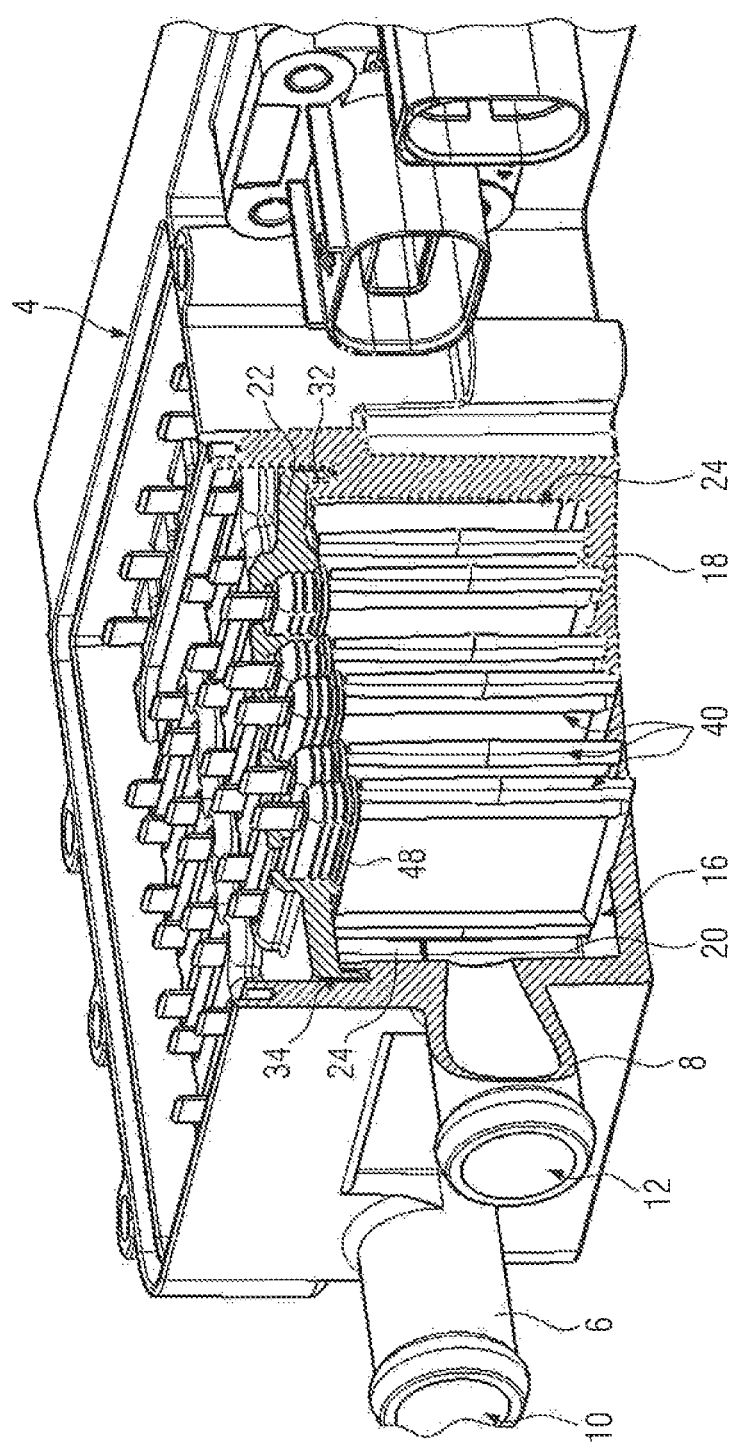
FIG. 2 shows a perspective side view of the embodiment shown in FIG. 1.

As illustrated in FIGS. 2 and 5, the oppositely disposed side of the PTC elements 40 abuts the base 18 of the casing 2 after installation. Provided in the base 18 for exact positioning are depressions 144 in which the face side surfaces of the heating element casing 134 are received. This ensures exactly right-angled positioning of the PTC heating elements relative to the partition wall 54. Furthermore, a holding force is generated which prevents the PTC heating elements 40 plugged into the partition wall 54 from dropping out of the female plug element holding fixtures 44 during operation and in particular due to the vibration of the vehicle. This base-side abutment of the PTC heating elements 40 also ensures the contact pressure within the plug contact of the PTC heating elements, so that they securely and also permanently seal the longitudinal slots 46 to the connection chamber 56.

It is understood that the depressions 144 can also be dispensed with. Similar to the abutment ridges 137, an abutment ridge 137 can also be provided on the underside of the plastic frame 134 disposed opposite to the sealing collar 48 and seal there and be supported and in abutment against the base 18 of the casing 2 subject to elastic compression. This not only provides a fluidly tight seal between the underside of the PTC heating element 40 and the casing 2. Rather, a compressive force is also generated due to the compression of the abutment ridge and holds the PTC heating element 40 captively in the female plug element holding fixture 44 even when strong vibrations act upon the electric heating device.

7. Electric Connection of the PTC Heating Elements

Figure 14:
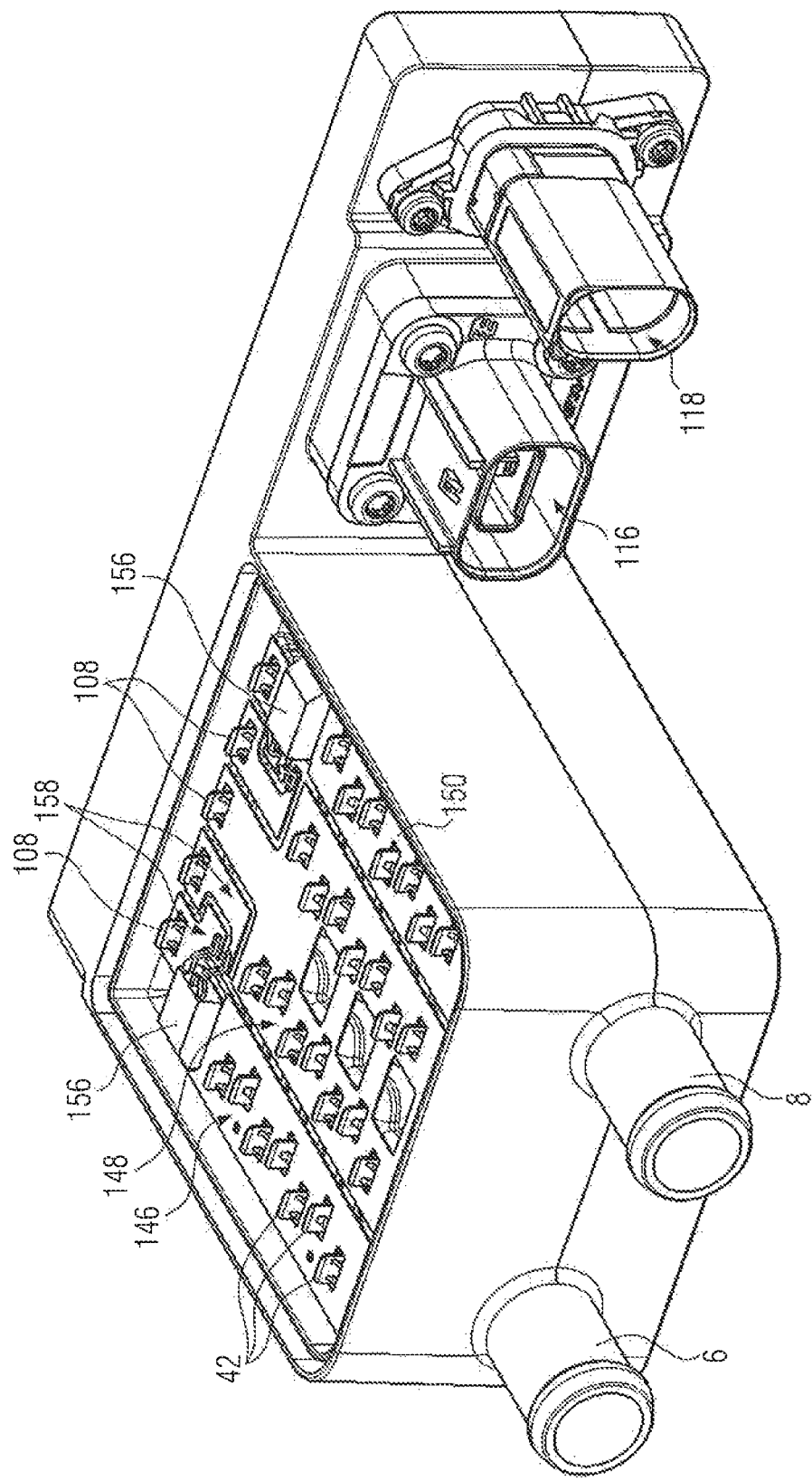
FIG. 14 shows a perspective side of a further embodiment with the casing cover removed.
Figure 15:
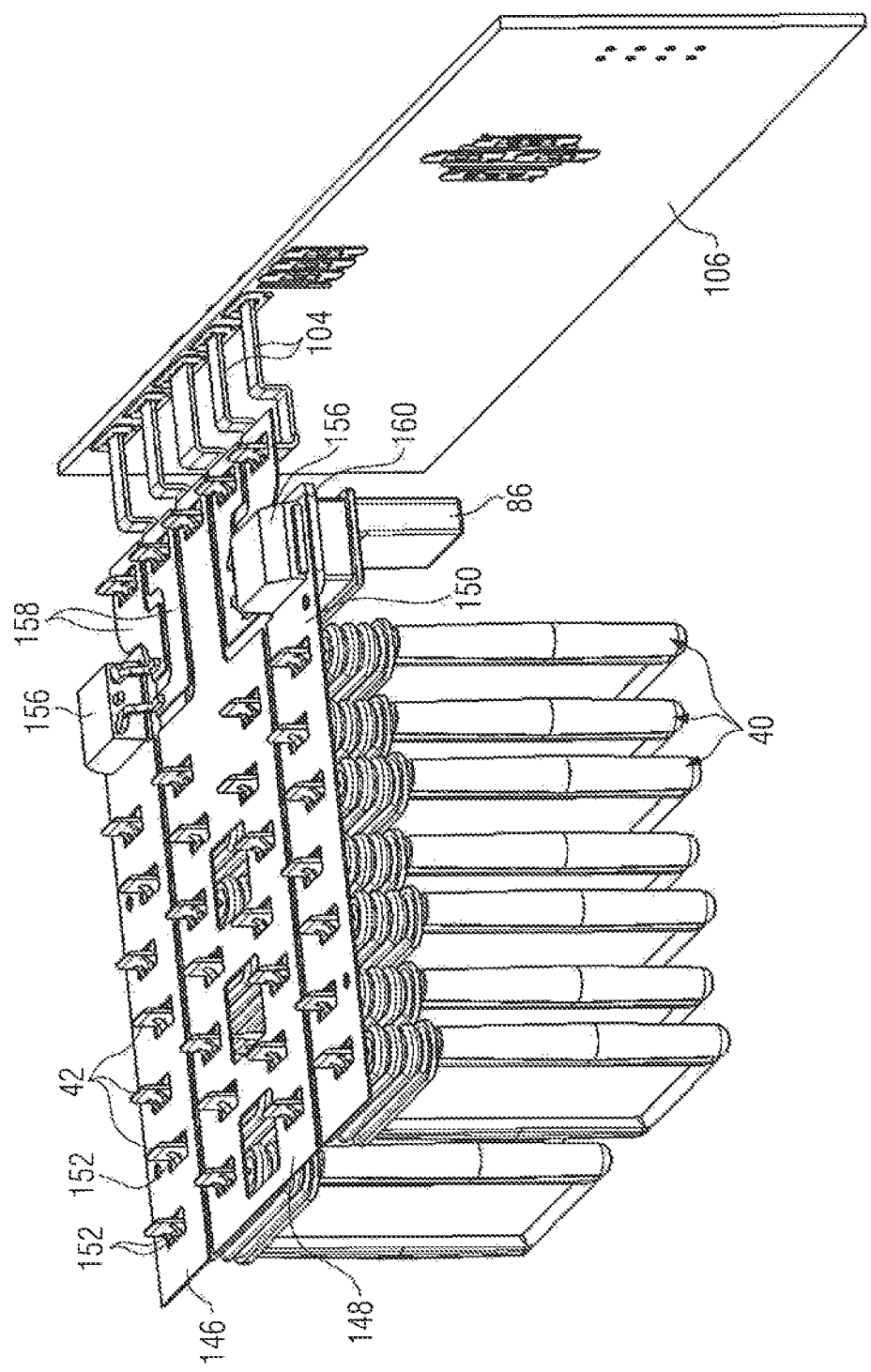
FIG. 15 shows a view similar to FIG. 14 of the further embodiment without the casing cover.
Figure 16:
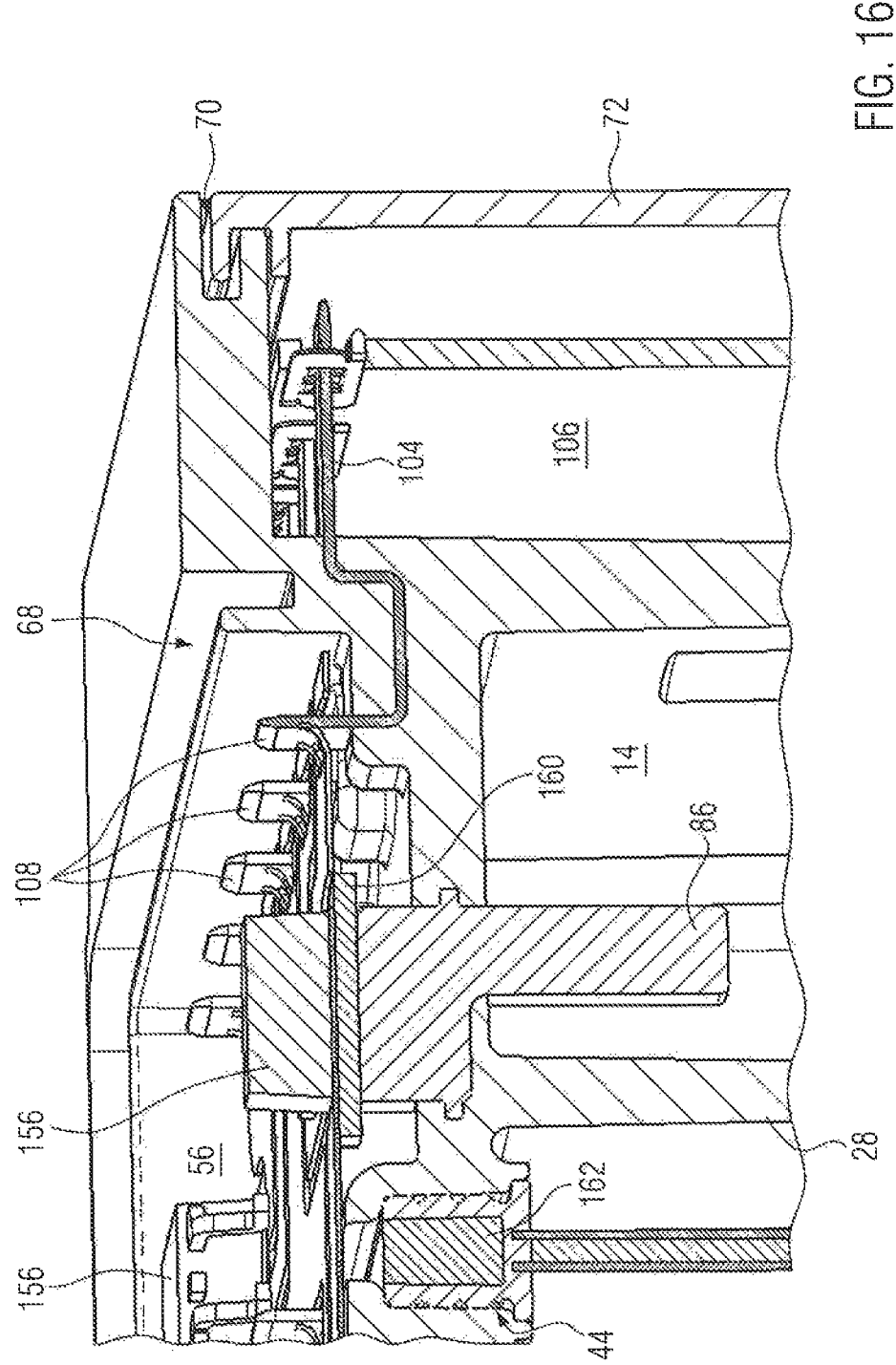
FIG. 16 shows a perspective sectional view through the partition wall of the further embodiment.

FIGS. 14-16 illustrate the electric connection of the PTC heating elements 40 using the example of a further embodiment. FIG. 15 shows the embodiment without the casing 2 and parts thereof, similar to the illustration in FIG. 3. For the electric connection, pieces of punched sheet metal are provided in the connection chamber 56 as current bars 146, 148, 150, comprising contact projections 152 formed by punching and bending which abut against the contact strips 42 subject to elastic pretensioning and contact them. The contact projections 152 project into receptacle openings 154 which are recessed in the sheet metal strips of the current bars 146, 148, 150. The current bar, designated by reference numeral 148, has a corresponding receptacle opening 154 with contact projections 152 for the current bar 104. The current bars, designated by reference numbers 146 and 148, are each equipped with a power transistor 156 which is connected in an electrically conductive manner to the respective current bar 146, 150 and mounted thereon. The power transistors 156 are connected on the input side to conductors 158 which are likewise formed as current bars, and which are again provided with receptacle openings 154 with contact projections 152 for respectively contacting via a current bar 104. Electric conduction within the containment chamber 56 [sic] is effected solely by way of sheet metal elements. These sheet metal elements are equipped exclusively with the power transistors 156 as electric or electronic components. No further electric or electronic components are provided.

As shown in particular in FIG. 16, these metal plates 146, 148, 150, 158 are inserted in a manner electrically insulated from one another into the connection chamber 56 and positioned there. The control signals for actuating the power transistors 146 processed on the circuit board 106 are supplied to the respective power transistor 156 via at least one of the conductors 158.

FIG. 16 illustrates a sectional view at the height of a cooling element, denoted by reference numeral 86 also in FIG. 15. An electrical insulation coat 160 made, for example, of Kapton or a ceramic plate is implemented between the cooling element 86 and the power transistor 156. The current bar 146, 150 provided between this insulation coat 160 and the power transistor 156 results in a certain spread of the heat emitted by the power transistor 156. For this purpose, the current bar 146 or 150, respectively, can be configured to have a greater thickness at least in the region of the power transistor 156. It is equally possible to form the current bar 146 or 150, respectively, from copper and thus from a material that exhibits good thermal conductivity. The sheet metal material can have an increased thickness in the region of the power transistor 156 due to contour rollers.

The current bars 146, 148, 150, 158 can be provided with a crimping tab or the like by way of punching which interacts with the casing 2 to attach the respective current bar 146, 148, 150, 158 to the casing 2, and/or to abut or press the power transistor 146 against the cooling element 86 subject to pretension.

FIG. 16 also shows a variant of the PTC heating element 40. According thereto, the contact strips 42 are received within the plastic frame 134 in an attachment plug 162 formed from a hard plastic component. The contact strips 42 are received in the attachment plug 162 by way of overmolding. The attachment plug 162 is made of hard plastic material with good resistance to leakage current and sparkover. The attachment plug 162 forms a hard core for the male plug element formed by the PTC heating element 40. This attachment plug 162 is merely covered by a thin coating of the soft-elastic material of the sealing collar 48, whereby the compression force formed by the sealing collar 48 within the female plug element holding fixture 44 is increased. The attachment plug 162 can be effected, for example, by overmolding two sheet metal strips 128, each of which individually forms the contact ridges 130 and the contact strips 42 as an integrally formed component. Prepared in this manner and positioned spatially and physically relative to one another, the attachment plug 162 together with the sheet metal strip 128 can be overmolded with the soft-elastic plastic component for forming the plastic frame 134, as described above.

The sealing collar is formed to be elongate also in the variant according to FIGS. 14-16. However, it goes without saying that each individual contact strip 42 can be arranged in a cylindrical sealing collar with a basically circular or oval cross-sectional area. The female plug element holding fixture 44 is then likewise provided with a cross-section that is circular or oval, respectively. Such an embodiment can increase the tightness as compared to the specifically described embodiment. It is understood that polygonal cross-sectional areas are also possible.

FIG. 16 further shows the attachment of the cooling element 86 within the partition wall 54. At the height of the partition wall 54, the cooling element 86 has an attachment collar 164 on its outer circumference which projects beyond the cooling element 86 on the edge side and is sealed in a positive-fit manner by overmolding the plastic material forming the partition 54. The design of the attachment collar 164 incidentally also improves the tightness between the circulation chamber 14 and the connection chamber 56.

According to a variant (not shown), the surface of the cooling element 86 projecting to the connection chamber 56 can also be covered with the plastic material forming the partition wall 54. When the cooling element 46 is overmolded, a thin film can be formed by injection molding between the surface of the cooling element 86 and the interior of the connection chamber 56, via which the power transistor 156 abuts against the cooling element 68 in an electrically insulated manner. This further simplifies production. A separate electrical insulation layer does not need to be provided between the power transistor 156 and the cooling element 86.

We claim:

1. An electric heating device comprising:
a PTC heating element having a heat emitting surface;
a platelet-type PTC element having a length or width being greater by at least a factor of five than the thickness, main side surfaces for decoupling heat and face side surfaces extending perpendicular to the main side surfaces, and which has two main side surfaces and two face side surfaces extending perpendicular to the main side surfaces; and
a casing which forms inlet and outlet openings for a fluid to be heated and which forms a circulation chamber in which the heat emitting surface of a PTC heating element is exposed and which is coupled in a heat conductive manner to the PTC element, wherein
the PTC element is contacted in an electrically conductive manner by way of electrical conductor tracks to different polarities, which conductor tracks are contacted in an electrically conductive manner to said face side surfaces of said PTC element, and
wherein said conductor tracks are each formed by sheet metal strips, each forming a contact ridge abutting at a face side surface thereof against said PTC element and a contact strip, and wherein said contact ridges have a smaller thickness than said PTC element.

2. The electric heating device according to claim 1, wherein said two contact strips of said conductor tracks of said PTC element are arranged partially protruding over said PTC element and are directed toward each other on one of the face sides thereof in a direction of longitudinal extension of said associated contact ridge and transversely to a direction of longitudinal extension of said associated contact ridge of said PTC element.

3. The electric heating device according to claim 1, wherein said sheet metal strips are adhesively bonded to said PTC element.

4. The electric heating device according to claim 1, wherein each of said sheet metal strips forms an edge surface which is disposed opposite to a contact surface thereof that is in contact with said the PTC element and which is flat over an entire length of said sheet metal strip.

5. The electric heating device according to claim 1, further comprising an insulation layer directly abutting against one of said main side surfaces of said PTC element in a heat conductive manner and forming a heat emitting outer surface.

6. The electric heating device according to claim 5, wherein said PTC element is, in its entirety, embedded in a plastic frame enclosing all edge surfaces of said insulation layer.

7. The electric heating device according to claim 6, wherein said plastic frame is connected to said PTC element and said insulation layer by injection molding around said insulation layer.

8. The electric heating device according to claim 1, further comprising two insulation layers, each of which directly abuts against a respective one of the main side surfaces of said PTC element, wherein said PTC element is, in its entirety, embedded in a single piece plastic frame enclosing all edge surfaces of at least one of the insulation layers, wherein one of said insulation layers defines said heat emitting outer surface of said PTC heating element, and wherein said heat emitting outer surface of said one insulation layer is exposed in a frame opening of said plastic frame.

9. An electric heating device comprising:
a PTC heating element having a heat emitting surface;
a platelet-type PTC element having a length or width being greater by at least a factor of five than the thickness, main side surfaces for decoupling heat and face side surfaces extending perpendicular to the main side surfaces, and which has two main side surfaces and two face side surfaces extending perpendicular to the main side surfaces; and
a casing which forms inlet and outlet openings for a fluid to be heated and which forms a circulation chamber in which the heat emitting surface of a PTC heating element is exposed and which is coupled in a heat conductive manner to the PTC element, wherein the PTC element is contacted in an electrically conductive manner by way of electrical conductor tracks to different polarities, which conductor tracks are contacted in an electrically conductive manner to only said face side surfaces of said PTC element, wherein said conductor tracks are each formed by sheet metal strips, each of the sheet metal strips forming a contact ridge abutting against a respective one of the side face sides of said PTC element and a contact strip, and wherein said conductor tracks of said PTC element are arranged partially protruding over said PTC element directed toward each other on one of the face sides thereof in a direction of longitudinal extension of said associated contact ridge and transversely to a direction of longitudinal extension of said associated contact ridge of said PTC element.

10. The electric heating device according to claim 9, wherein said contact ridges have a smaller thickness than said PTC element.

11. The electric heating device according to claim 9, wherein said sheet metal strips are adhesively bonded to said PTC element.

12. The electric heating device according to claim 9, wherein each of said sheet metal strips forms an edge surface which is disposed opposite to a contact surface thereof that is in contact with said the PTC element, and which is flat over an entire length of said sheet metal strip.

13. The electric heating device according to claim 9, further comprising an insulation layer directly abutting against one of said main side surface of said PTC element in a heat conductive manner and forming said heat emitting outer surface of said PTC heating element.

14. The electric heating device according to claim 13, wherein said PTC element is, in its entirety, embedded in a plastic frame enclosing all edge surfaces of said insulation layer.

15. The electric heating device according to claim 14 wherein said plastic frame is connected to said PTC element and said insulation layer by injection molding around said insulation layer.

16. The electric heating device according to claim 13, further comprising two insulation layers, each of which directly abuts against a respective one of the main side surfaces of said PTC element, wherein said PTC element is, in its entirety, embedded in a single piece plastic frame enclosing all edge surfaces of the insulation layer.

17. An electric heating device comprising:
a PTC heating element having a heat emitting surface;
a platelet-type PTC element having a length or width being greater by at least a factor of five than the thickness, main side surfaces for decoupling heat and face side surfaces extending perpendicular to the main side surfaces, and which has two main side surfaces and two face side surfaces extending perpendicular to the main side surfaces; and
a casing which forms inlet and outlet openings for a fluid to be heated and which forms a circulation chamber in which the heat emitting surface of a PTC heating element is exposed and which is coupled in a heat conductive manner to the PTC element, wherein said PTC element is contacted in an electrically conductive manner by way of electrical conductor tracks to different polarities, which conductor tracks are contacted in an electrically conductive manner to only said face side surfaces of said PTC element and which conductor tracks are projected via a partition wall into a connection chamber, which partition wall separates the circulation chamber from the connection chamber in a fluid-tight manner; and an insulation layer directly abutting against one of said main side surface of said PTC element in a heat conductive manner and forming said heat emitting outer surface of said PTC heating element, and wherein said PTC element is embedded in a single piece plastic frame enclosing all edge surfaces of said insulation layer and providing a frame opening exposing outer main side surfaces of said insulation layer.

18. The electric heating device according to claim 17, wherein said plastic frame is connected to said PTC element and said insulation layer by injection molding around said insulation layer.

19. The electric heating device according to claim 18, wherein two contact strips of said conductor tracks of said PTC element are arranged partially protruding over said PTC element and are directed toward each other on a face side thereof in a direction of longitudinal extension of said associated contact ridge and transversely to a direction of longitudinal extension of said associated contact ridge of said PTC element.

20. The electric heating device according to claim 19, wherein said contact ridges have a smaller thickness than said PTC element.

21. The electric heating device according to claim 19, wherein said sheet metal strips are adhesively bonded to said PTC element.

22. The electric heating device according to claim 21, wherein each of said sheet metal strips forms an edge surface which is disposed opposite to a contact surface thereof that is in contact with said the PTC element, and which is flat over an entire length of said sheet metal strip.

23. The electric heating device according to claim 17, wherein only said face-side surfaces of said PTC element are contacted in an electrically conductive manner by said conductor tracks.

24. The electric heating device according to claim 23, wherein said plastic frame provides a collar which is plug-connected in a fluid-tight manner in said partition wall.

* * * * *